(12) United States Patent
Shirley et al.

(10) Patent No.: US 10,305,918 B1
(45) Date of Patent: May 28, 2019

(54) MONITORING FOR HYBRID APPLICATIONS

(71) Applicant: VMware, Inc., Palo Alto, CA (US)

(72) Inventors: John David Shirley, Oakland, CA (US); Kelly Roach, Palo Alto, CA (US); Andrew Yousef, San Francisco, CA (US)

(73) Assignee: VMware Inc., Palo Alto, CA (US)

( * ) Notice: Subject to any disclaimer, the term of this patent is extended or adjusted under 35 U.S.C. 154(b) by 444 days.

(21) Appl. No.: 15/079,019

(22) Filed: Mar. 23, 2016

Related U.S. Application Data

(60) Provisional application No. 62/287,878, filed on Jan. 27, 2016.

(51) Int. Cl.
*H04L 29/06* (2006.01)

(52) U.S. Cl.
CPC ...... *H04L 63/1416* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 9,582,598 | B2* | 2/2017 | Kalgi | G06Q 20/227 |
| 10,154,084 | B2* | 12/2018 | Kalgi | G06Q 20/227 |
| 2010/0229173 | A1* | 9/2010 | Subrahmanyam | G06F 9/45533 718/103 |
| 2010/0299655 | A1* | 11/2010 | Heisch | G06F 11/3409 717/130 |
| 2013/0144852 | A1* | 6/2013 | Muller | G06F 17/30424 707/702 |
| 2014/0289726 | A1* | 9/2014 | Rugina | G06F 9/45525 718/1 |
| 2015/0019944 | A1* | 1/2015 | Kalgi | G06Q 20/227 715/205 |
| 2016/0026950 | A1* | 1/2016 | Kapur | G06Q 10/0639 705/7.38 |
| 2016/0142437 | A1* | 5/2016 | Beskrovny | H04L 63/1466 726/23 |
| 2017/0026393 | A1* | 1/2017 | Walsh | G06F 21/128 |
| 2017/0134479 | A1* | 5/2017 | Kalgi | G06Q 20/227 |
| 2017/0142138 | A1* | 5/2017 | Williams | H04L 63/1416 |
| 2017/0220798 | A1* | 8/2017 | Madou | G06F 21/552 |

(Continued)

*Primary Examiner* — Michael R Vaughan
(74) *Attorney, Agent, or Firm* — Thomas | Horstemeyer, LLP

(57) ABSTRACT

Some embodiments of the invention provide a novel method for monitoring instances of an application operating on a set of mobile devices. In some embodiments, the method receives content data to be used by the application and injects monitoring code into the content data before providing it to a web view of the application. In some embodiments, the content data includes various types of content (e.g., multimedia files, scripts, data files, etc.) received from a content server managed by the developer of the application and may be used by the native code and/or the web view of the hybrid application. The content data of some embodiments also includes monitoring code that is inserted by the developer of the application to monitor developer-specified events in the native code and/or web view. The method of some embodiments gathers monitored data from both the native code and the web view.

24 Claims, 10 Drawing Sheets

(56) References Cited

U.S. PATENT DOCUMENTS

| | | | |
|---|---|---|---|
| 2017/0223043 A1* | 8/2017 | Munoz | H04L 63/1483 |
| 2017/0237799 A1* | 8/2017 | Veeravalli | H04L 43/08 |
| | | | 709/224 |
| 2017/0242987 A1* | 8/2017 | Williams | G06F 21/125 |
| 2017/0250890 A1* | 8/2017 | Puls | H04L 43/14 |

* cited by examiner

MONITORING FOR HYBRID APPLICATIONS

CROSS-REFERENCE TO RELATED APPLICATIONS

This application is a continuation of and claims benefit to U.S. Provisional Patent Application No. 62/287,878 which was filed Jan. 27, 2016 and is incorporated by reference in its entirety.

BACKGROUND

The mobile device industry has been growing for a number of years. The growth in the industry has led to a proliferation of many different applications for mobile devices. Many of mobile device applications are native code applications (e.g., written in Java, Objective C, etc.) written for various mobile operating systems (e.g., Apple iOS, Android, etc.). However, the continuous growth and importance of the Internet, as well as the portability of web content between different platforms, has increased the prominence of web applications, which provide application content through an embedded web browser within the application. This has also lead to a growth in hybrid applications, which use a combination of both native code as well as web views (i.e., web browser components for viewing webpages), for different parts of the mobile application. However, monitoring (e.g., transaction tracking, error monitoring, etc.) for such hybrid applications is difficult because mobile web views often lack features (e.g., persistent storage, device system information, etc.) that are used for monitoring native code applications.

BRIEF SUMMARY

Some embodiments of the invention provide a novel method for monitoring instances of an application operating on a set of mobile devices. In some embodiments, the method receives content data to be used by the application and injects monitoring code into the content data before providing the content data to a web view of the application. In some embodiments, the content data includes various types of content (e.g., multimedia files, scripts, data files, etc.) received from a content server managed by the developer of the application and may be used by the native code and/or the web view of the hybrid application. The content data of some embodiments also includes monitoring code that is inserted by the developer of the application to monitor developer-specified events in the native code and/or web view.

In some embodiments, the method captures content data that is to be used by the web view and injects monitoring code at the mobile device, before the content data is displayed in the web view. The injected monitoring code of some embodiments includes wrapping functions or callback hooks, which are called when specific portions of code (e.g., function calls, error handlers, etc.) in the content data are executed in the web view. The wrapping functions or hooks of some embodiments then generate monitoring messages with monitoring data (e.g., context data, error codes, function parameters, etc.) when the portions of code are called (e.g., user inputs, system events, etc.) from within the web view.

The method of some embodiments captures events generated from both the native code and the web view of the application and sends monitored data to a monitoring server, which compiles the monitoring data for multiple instances of the application and provides reporting to a developer of the application. In some embodiments, in addition to events and errors generated by the native code and/or the web view of the application, the method of some embodiments also captures system events and properties, in conjunction with the application events to provide context for the different monitored events.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawings.

BRIEF DESCRIPTION OF THE DRAWINGS

The novel features as described here are set forth in the appended claims. However, for purposes of explanation, several embodiments are set forth in the following figures.

DETAILED DESCRIPTION

Figure 1:
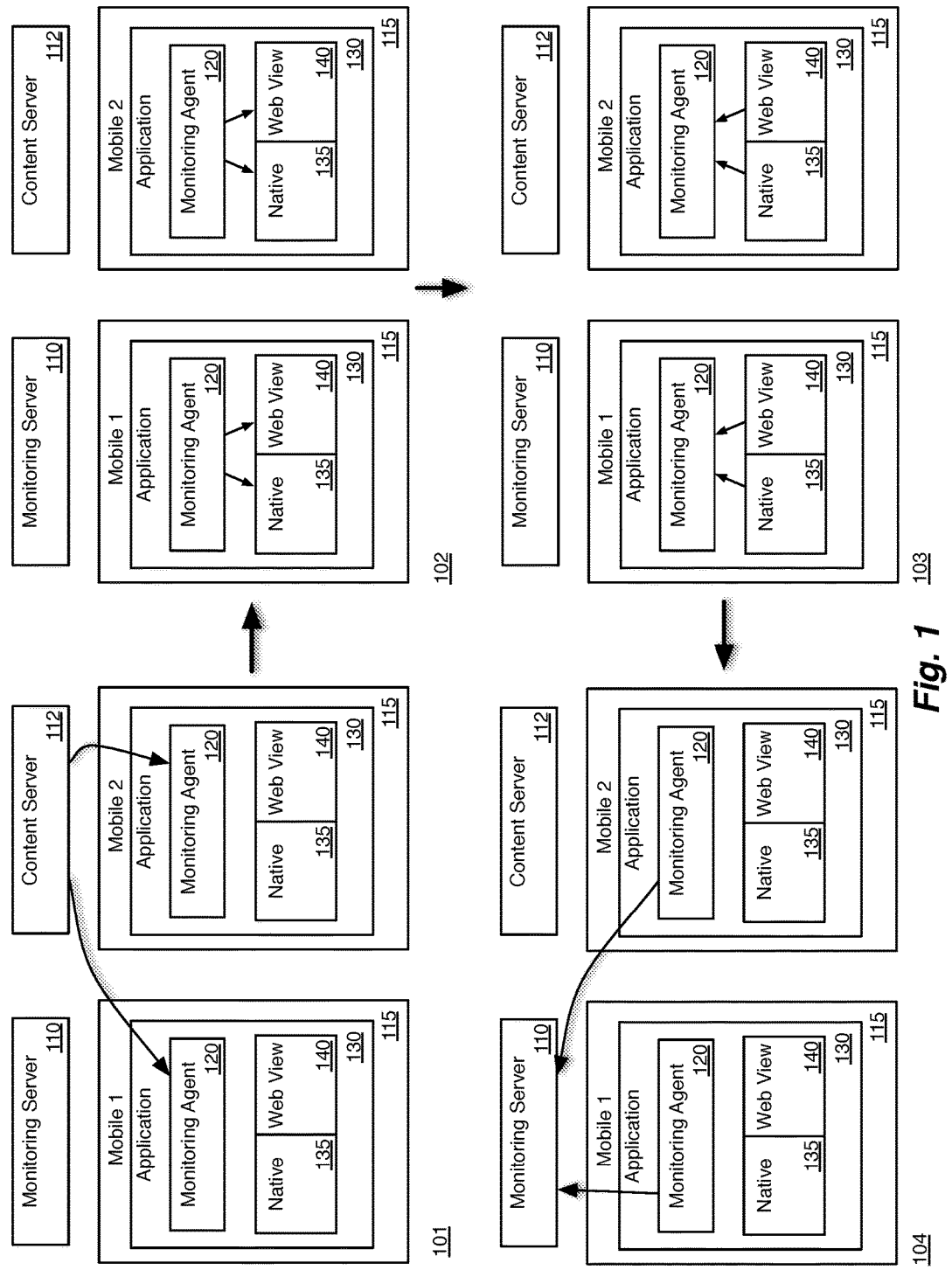
FIG. 1 illustrates an example of a system for monitoring hybrid applications.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for monitoring instances of an application operating on a set of mobile devices to provide a developer with aggregated performance data for the application. The monitoring of some embodiments includes tracking of user interactions with the application instances on several mobile devices that are then reported back to a developer of the application. For purposes of clarity, the term "user" will be used to refer to end users of the developed application, while the term "developer" will be used to refer to any entity (e.g., developers, business managers, etc.) related to the development of the application.

In some embodiments, the method receives content data to be used by the hybrid application and injects monitoring code into the content data before providing the content data to a web view of the application. In some embodiments, the content data includes various types of content (e.g., multimedia files, scripts, data files, etc.) that may be used by the native code and/or the web view of the hybrid application. In some embodiments, the content data for the web views is received based on network requests for page loads and/or other script networking calls from within a web page (e.g., JQuery, AJAX, XMLHttpRequest, etc.). The content data of some embodiments also includes monitoring code that is inserted by the developer of the application to monitor developer-specified events in the native code and/or web view.

In some embodiments, the method captures content data that is to be used by the web view and injects monitoring code at the mobile device, before the content data is displayed in the web view. The injected monitoring code of some embodiments includes wrapping functions or callback hooks, which are called when specific portions of code (e.g., function calls, error handlers, etc.) in the content data are executed in the web view. The wrapping functions or hooks of some embodiments then generate monitoring messages with monitoring data (e.g., context data, error codes, function parameters, etc.) when the portions of code are called (e.g., user inputs, system events, etc.) from within the web view.

The method of some embodiments captures the monitoring messages generated by both the native code and the web view of the application. The monitoring messages of some embodiments are generated to monitor errors, services (e.g., web requests), and transactions. Error monitoring in some embodiments includes system errors (e.g., crash reporting, unhandled exceptions, etc.) and logical errors that may not cause the system to fail, but may lead to undesirable results. In some embodiments, in order to track logical errors, the method monitors developer-specified information (e.g., breadcrumbs, user metadata, handled exceptions, etc.) to provide information that can be used to troubleshoot and identify logical errors. Breadcrumbs in some embodiments are monitoring calls that are included by the developer in the application code to track developer-specified variables and values in the monitored data.

Service monitoring tracks a user's interaction with a web view of the application, such as through browsing and opening new pages, as well as AJAX calls, XML, HTTP requests, etc. on a page that has already been loaded. The service monitoring of some embodiments tracks information (e.g., uniform resource locator (URL), latency, response codes, bytes in/out, etc.) about each request made in the web view of the mobile application.

Transactions are used to track values (e.g., shopping cart values) for developer-defined portions of the code that define the bounds of a transaction. Transactions are arbitrary units of business value or user interactions in an application. In some embodiments, custom transactions are defined by an application developer using software development kit (SDK) calls that indicate the beginning and end of a transaction.

Once the method captures the monitored data, the method sends the monitored data to a set of monitoring servers, which compile the monitored data for multiple instances of the application and provides reporting to a developer of the application. In some embodiments, in addition to monitored events and errors generated by the native code and/or the web view of the application, the method of some embodiments also captures context information (e.g., system events and properties), in conjunction with the application events to provide context for the different monitored events.

The monitoring servers of some embodiments then gather the monitored performance data (e.g., error data, crash data, and/or service monitoring data) from the hybrid applications and generate benchmarking metrics (e.g., monthly active users (MAU), daily active users (DAU), website loading statistics, etc.) for the hybrid applications that execute on the computing devices (e.g., mobile devices). In some embodiments, the monitoring servers also provide detailed reporting based on the metrics and monitored data for the developers of the hybrid applications.

FIG. 1 illustrates an example of a system for monitoring hybrid applications operating on mobile devices in three stages 101-103. The system of this example shows a monitoring server 110, a content server 112, and multiple mobile devices 115. Each mobile device runs an application 130, which includes a monitoring agent 120, as well as native code 135 and a web view 140.

In some embodiments, native code 135, as used in this application, refers to a customer's native code for the application. The monitoring agent 120 refers to a module or daemon that provides monitoring services for the application 130. Although shown as separate elements in this example, the monitoring agent 120 and the native code 135 of some embodiments are implemented as portions (e.g., modules, etc.) of a single application. In some embodiments, the monitoring agent 120 is implemented through various monitoring calls that are made throughout the native code. The monitoring agent 120 of some embodiments describes code inserted (e.g., through an application programming interface (API) or software development kit (SDK)) into the customer's native code. In some embodiments, the developer uses the inserted code to identify specific web view instances of the hybrid application to be monitored.

The web view 140 of some embodiments is used to provide content that changes frequently or is based on an existing web interface. For example, a hybrid application may use a native interface for providing maps, but may provide a web view to provide restaurant listings that frequently change (look and feel, content, etc.). In such cases, developers can make frequent changes to the web view content without having to redeploy the whole app or to go through a submission process for an application marketplace.

Another example is a hybrid marketplace application, which allows a user to browse and select product in the native app, but uses a web view to collect payment information through a third party checkout page. The developer may have already developed the interface to the third party service for the online store front, and using the web view allows the developer to reuse the checkout code and avoid developing a separate solution for the mobile application.

Web views and native code are often written in different languages, using different interface elements and libraries for operating on a mobile device, so some embodiments provide separate SDKs for the web views and the native code. In some embodiments a developer uses a separate SDK for the web view that provides the monitored data directly to the monitoring servers. However, in some cases, by communicating directly with the monitoring servers, the developer-specified code in the content of the web view is unable to track related context data (e.g., battery life, OS version, disk space, memory, application version number, etc.) or is otherwise limited due to a lack of certain features in the web view (e.g., persistent storage, etc.).

In addition to the native code 135 and the web view 140, the application 130 includes a monitoring agent 120 that monitors the application for various events (e.g., errors, breadcrumbs, transactions, etc.) in the application (or on the mobile device). In preferred embodiments, while a developer is provided with SDKs for both native code and for web views, both SDKs communicate with the monitoring agent 120, allowing for consolidated and standardized outputs to the monitoring servers 110. All the logging is done through the monitoring agent 120, which also allows for the capture of additional context information (e.g., battery life, OS version, disk space, memory, application version number, etc.) by directly accessing system information and resources (e.g., persistent storage).

In some cases, the monitoring agent 120 would have required additional services (e.g., cross origin resource sharing (CORS)) to handle requests (e.g., AJAX requests) from the web view. For example, if a page is loaded from xyz.com and the content from xyz.com contains Javascript that needs to communicate with the monitoring servers 110, the request would fail due to CORS. However, by performing all the monitoring through the monitoring agent 120, the injected (and embedded) monitoring code for the web view 140 is simplified, as it no longer needs to perform its own networking and provide such services.

In the example of FIG. 1, the first stage 101 shows that the content server 112 provides various content data (e.g., HyperText Markup Language (HTML) code, cascading style sheets (CSS), JavaScript, images, media files, monitoring code, etc.) to the mobile application 115. Although shown as a single server, content server 112 may represent multiple different servers and/or services (e.g., image servers, web servers, cloud storages, etc.).

In this example, the monitoring agent 120 captures all of the content data from the content server 112. In some embodiments, the monitoring agent 120 only captures content data from the content server 112 that is destined for the web view 140, while content data for the native code 135 is processed by the application 130 directly. In some embodiments, the monitoring agent 120 captures the content data for the web view 140 so that additional monitoring code can be injected into the content data before the content is displayed in the web view 140.

Once the monitoring agent 120 has processed the content data (e.g., by injecting monitoring code), the monitoring agent 120 sends (as shown in the second stage 102) the content data to the native code 135 and the web view 140 of the application 130 to be presented to a user of the mobile device. In some embodiments, user interface (UI) elements (e.g., links, buttons, navigation elements, etc.) are included in the presented data of a web view or through an interface specified by the native code.

In the third stage 103, the application 130 monitors the application (i.e., the native code 135 and web view 140) for various events (e.g., user interaction with UI elements, function calls, transaction data, error data, etc.). The third stage 103 also shows that both the native code 135 and web view 140 send the monitored information back to the monitoring agents 120. In some embodiments, the monitoring agent 120 also collects additional context information from the mobile device to be sent along with the monitored information.

In the fourth stage 104, the monitoring agents 120 then send the collected monitored data to a monitoring server (or servers) 110, which compiles and analyzes the monitored data to calculate various benchmarking metrics (e.g., monthly active users (MAU), daily active users (DAU), website loading statistics, etc.). In some embodiments, the monitoring servers 110 also provide various types of reporting for the developers (or other interested parties) of the hybrid mobile applications.

Figure 2:
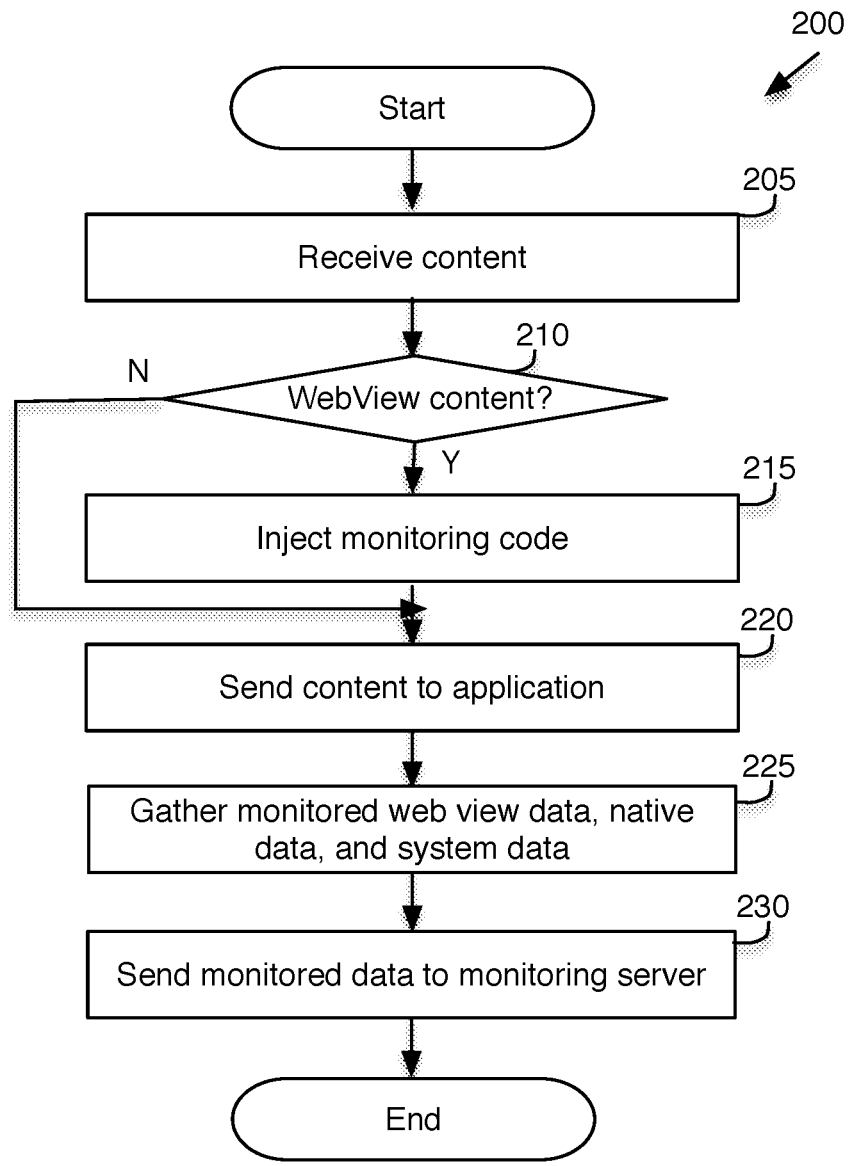
FIG. 2 conceptually illustrates a process for injecting code and monitoring events for a web view of a hybrid application.

As described above, the monitoring agents of some embodiments inject monitoring code into content data for a web view. FIG. 2 conceptually illustrates a process for injecting code and monitoring events for a web view of a hybrid application. In some embodiments, the process 200 is performed by a monitoring agent, similar to those described with reference to FIG. 1 above and FIG. 3 below. The process 200 begins by receiving (at 205) content data from a content server.

At 210, the process 200 determines whether the received content is web view content (e.g., web pages, JavaScript code, etc.) that is to be presented in a web view. When the process 200 determines (at 210) that the received content is web view content, the process 200 injects (at 215) monitoring code into the received content data, allowing the process 200 to monitor events that occur in the web view. Once the process 200 has injected (at 215) the monitoring code, or when the process 200 determines (at 210) that the received content data is not web view content (i.e., native content), the process 200 sends (at 220) the content data to the application to be presented on the mobile device.

The process 200 then gathers (at 225) the monitored web view data, native data, and system event data from the application. In some embodiments, the process 200 gathers some of the system data as context data for the web view and native data, providing additional information for developers regarding various system conditions (e.g., network connectivity, application crashes, etc.) for the various native and web view events.

Finally, the process 200 sends (at 230) the gathered monitor data to the monitoring server. In some embodiments, the process 200 sends the monitoring data periodically (e.g., every 10 minutes), while in other embodiments the process sends the monitoring data as it becomes available. In some embodiments, the process 200 sends the gathered monitored data upon receiving requests from the monitoring server.

The monitoring server of some embodiments processes the gathered monitor data to identify problems and usage patterns for the various instances of the hybrid application. In some embodiments, the process 200 performs a portion of the processing (e.g., selecting a list of breadcrumbs to send with transactions, aggregating data, calculating sessions lengths, etc.) prior to sending the gathered data to the monitoring server. However, in preferred embodiments, the majority of the processing is performed by the monitoring servers to maintain a simple and efficient monitoring agent.

Although the process 200 is shown for a single transaction of content data with a monitoring agent, one skilled in the art will recognize that the process 200 of some embodiments is performed repeatedly as new content is requested and received by the application (e.g., in response to user interactions, etc.).

Figure 3:
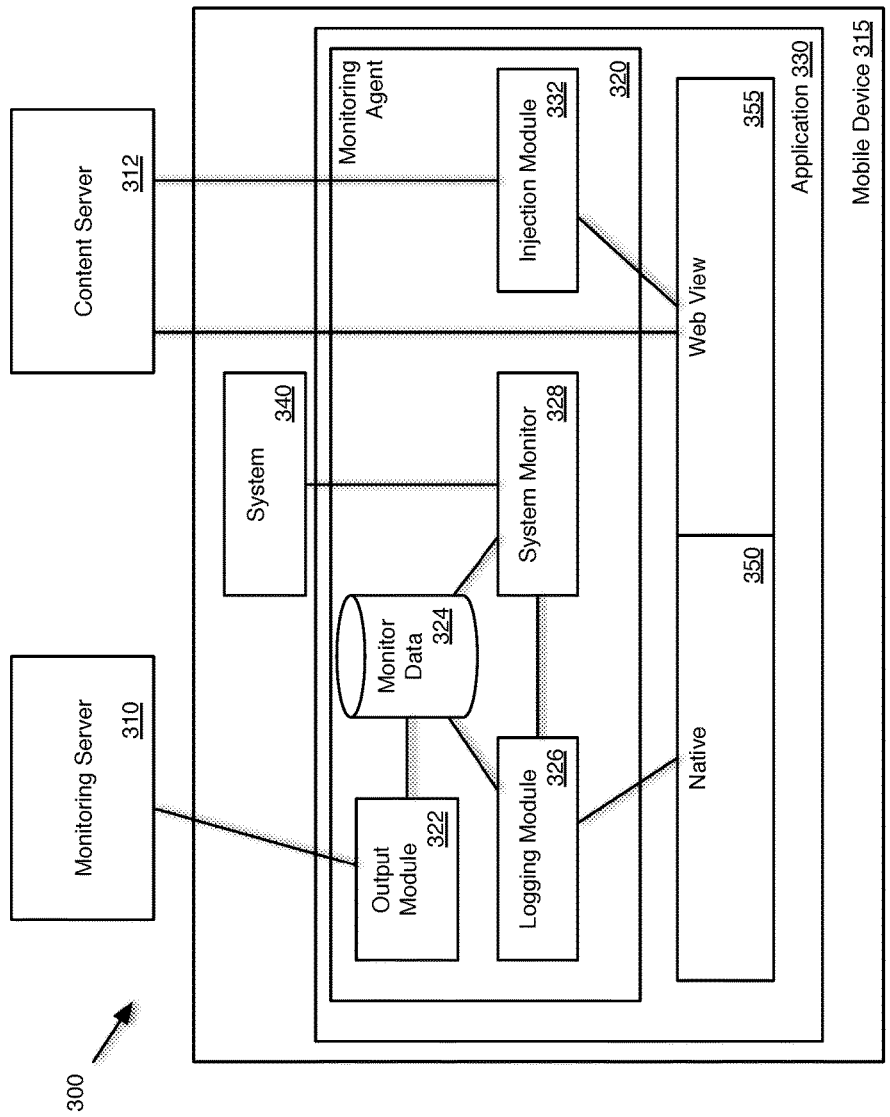
FIG. 3 illustrates an example of a monitoring agent for a hybrid application of a mobile device.

FIG. 3 illustrates an example of a monitoring agent for a hybrid application of a mobile device. This example shows the monitoring server 310, content server 312, and a mobile device 315, similar to the example of FIG. 1. However, this example provides a more detailed description of the elements of monitoring agent 320.

As described above, the content server 312 provides various resources (e.g., HTML code, cascading style sheets (CSS), JavaScript, images, media files, etc.) to the mobile application 330. Although shown as a single server, content server 312 may represent multiple different servers and/or services (e.g., image servers, web servers, cloud storages, etc.). The mobile device 315 includes various system elements 340 (e.g., processor, operating system, network interfaces, etc.) and an application 330, which provides monitored data to the monitoring server 310. The monitoring server 310 of some embodiments collects and analyzes the monitored data that is collected from the various instances of the hybrid applications.

The application 330 includes native code 350, web view 355, and a monitoring agent 320. Although shown as separate elements in this example, the monitoring agent 320 and the native code 350 of some embodiments are implemented as portions (e.g., modules, etc.) of a single application. In some embodiments, the monitoring agent 320 is implemented through various monitoring calls that are made throughout the native code. The monitoring agent 320 of some embodiments describes code inserted (e.g., through an application programming interface (API) or software development kit (SDK)) into the customer's native code. In some embodiments, the developer uses the inserted code to identify specific web view instances of the hybrid application to be monitored.

The monitoring agent 320 includes an injection module 332, logging module 326, system monitor 328, monitor data store 324, and output module 322. The injection module 332 of some embodiments captures content data from the content server 312 when it is destined for the web view 355, while native content data is processed directly by the native code 350. The injection module 332 injects monitoring code into the captured content data prior to passing it on to the web view 355. The injected monitoring code of some embodiments includes wrapping functions or callback hooks, which are called when specific portions of code (e.g., function calls, error handlers, etc.) in the content data are executed in the web view. The wrapping functions or hooks capture and/or modify different functions in the web content.

In some cases, the injection module 332 uses wrapper functions that capture existing functions (e.g., JavaScript request/response functions) in the web content. For example, the injection module 332 of some embodiments identifies error handlers (e.g., window.onerror) in the received content data and wraps each error handler with monitoring code that sends a monitoring message to the logging module 326 whenever the error handler gets called. In some embodiments, the error handlers are wrapped with monitoring code to record URL's, latency, and error codes as well as store the original member callbacks in safe storage (in case developer's code tries to get them via property access for any reason). The monitoring message provides the recorded information to the logging module 326 about the error each time the error handler is triggered.

In addition to the injected monitoring code, in some embodiments, the content data (native and/or web view) received from the content server 312 includes embedded monitoring code. The monitoring code may be embedded in the content data for the native code 350 and/or the web view 355 using different SDKs for the different content data types. For example, in some embodiments, the embedded monitoring code for content data of a web view uses a JavaScript SDK, using JavaScript methods (e.g., crittercism.leavebreadcrumb("hello world");) to mark events for the content data, while the embedded monitoring code for content data of the native code uses a different SDK with different methods (e.g., leaveBreadcrumb:@"hello world").

In some embodiments, the web view 355 communicates with the logging module 326 by sending messages (e.g., JavaScript Object Notation (JSON) messages) between the web view and the monitoring agent 320. In some embodiments, even when the SDKs for the native code and the web view are different, both SDKs use a single message format that the web view and the native code use to send monitoring data to the monitoring agent. In some embodiments, both the injected and embedded monitoring code may use a same message format to send the monitored data to the monitoring agent.

The monitoring code of some embodiments uses a customized URL schema to pass monitoring messages from the application (the native code and/or the web view) to the monitoring agent 320. For example, web view 355 may include network calls to send a monitoring message using a custom URL schema (e.g., custom_schema://<appid>/log?url=billing.com&latency=30) when the user makes a request to an outside website. In this example, the message indicates the requested website, as well as the latency for the request.

Similarly, the native code 350 may include network calls to send a monitoring message using the custom URL schema, such as custom_schema://<appid>/logBreadcrumb?text="view1"&value=4, when the user brings up a particular view or screen in the native application. In this example, the message indicates a request to log a breadcrumb, with various attributes (i.e., text="view1"&value=4). Such breadcrumbs may be included by the developer for troubleshooting or to collect usage information.

In some embodiments that use the custom URL schema, the logging module 326 of some embodiments captures all network traffic being sent on a device, and each request is handled based on the request's URL scheme (e.g., http, https, ftp, etc.). The logging module 326 identifies network traffic that uses the customized URL schema as a monitoring message.

The logging module 326 of some embodiments gathers the monitoring messages generated by the monitoring code (both embedded and injected) generated by both the web view 355 and the native code 350. In some embodiments, in addition to events and errors generated by the native code and/or the web view of the application, the logging module 326 of some embodiments also captures system events and properties through a system monitor 328. In conjunction with the application events, the captured system information provides context data (e.g., battery life, OS version, disk space, memory, application version number, etc.) for the different monitored events.

The system monitor 328 of some embodiments accesses the system 340 of the mobile device 315 to determine statuses and attributes for the various native and web view events. In addition to providing context information for the logging module 326, the system monitor 328 of some embodiments also monitors the system for particular system events (e.g., network connectivity, application crashes, etc.) that may not be directly related to events in the application 470.

In some embodiments, the logging module 326 and the system monitor 328 store the gathered monitored data in a monitor data store 324. Output module 322 of some embodiments collects the monitored data from the data store 324 and sends it to the monitoring server 310. In some embodiments, the output module 322 also performs some analysis or aggregation of the data prior to sending the monitoring data to the monitoring servers 310.

In some embodiments, the output module 322 sends the monitoring data periodically (e.g., every 10 minutes), while in other embodiments the output module 322 sends the monitoring data as it becomes available in the monitor data store 324. In some embodiments, the monitoring server 310 sends requests to the output module 322 to retrieve the monitored data.

Figure 4A:
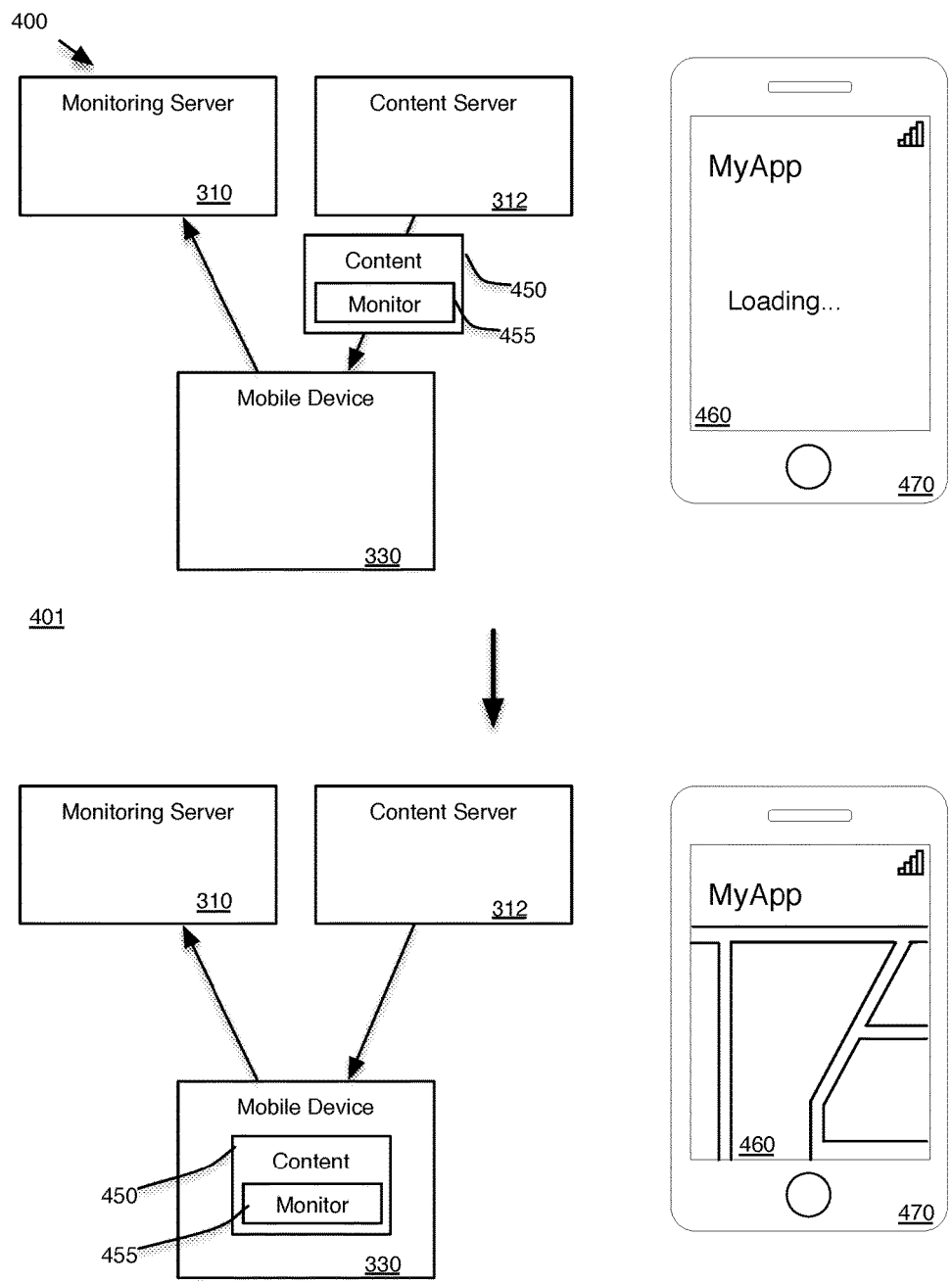
FIGS. 4A-B illustrates an example of monitoring native content based on embedded monitoring code.
Figure 4B:
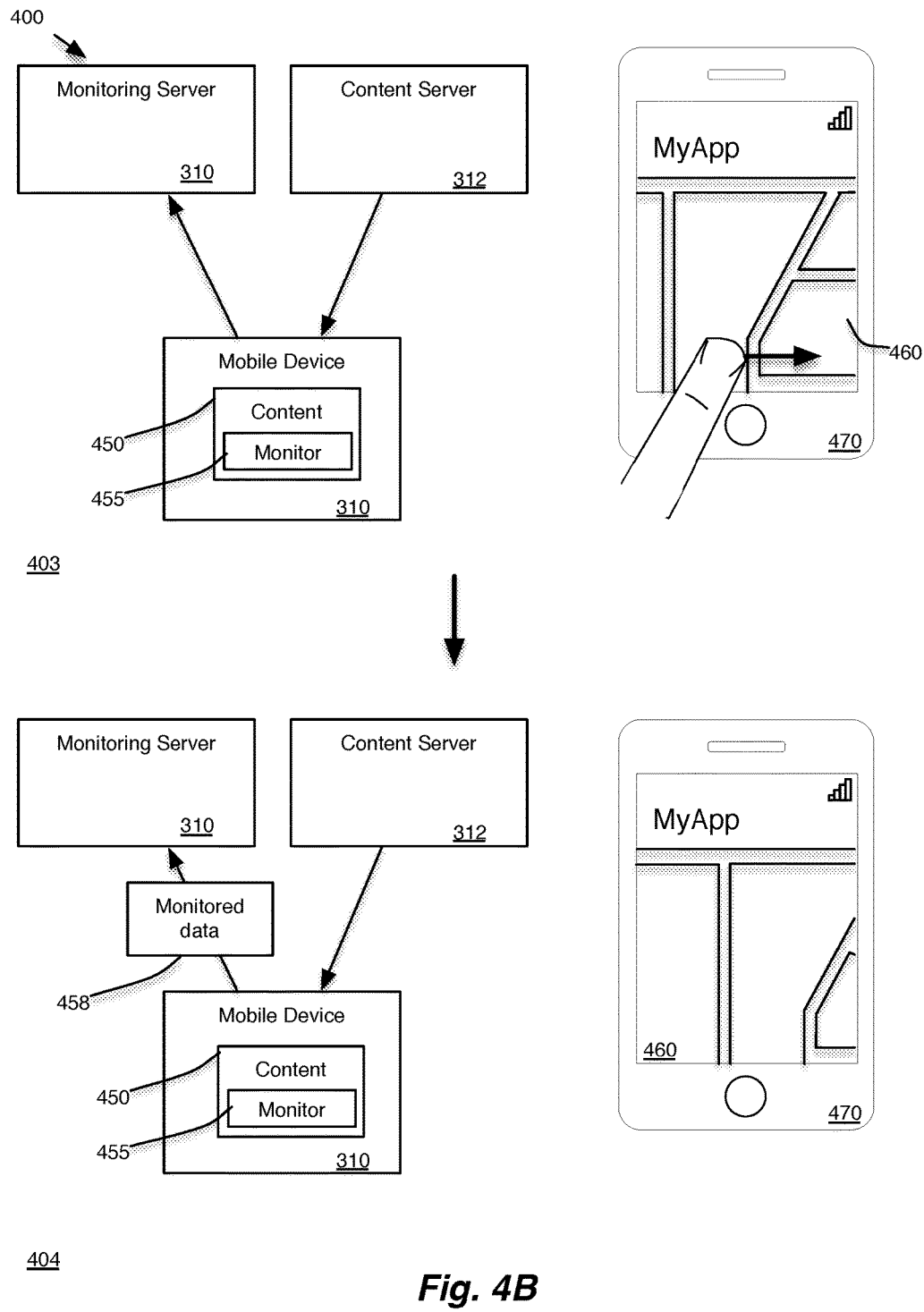

Examples of operations of the monitoring agent are described below with reference to FIGS. 4-6. FIGS. 4A-B illustrates an example of monitoring native content based on embedded monitoring code in four stages 401-404. In some embodiments the native content is monitored through calls to a library that are embedded into the code by the developer.

There are various types of monitoring that are performed. User-identified events (e.g., transactions, handled errors, etc.) are embedded in the code by the developer. In some embodiments, other types of monitoring (e.g., service monitoring, error reporting, etc.) are automatically performed by other monitoring code that captures unhandled errors/exceptions. Each stage of this example shows the system 400 on the left side and the application operating on a mobile device 470 on the right side.

The first stage 401 shows content server 312 sends content 450 with embedded monitoring code 455 to the mobile device 470. In this example, the embedded monitoring code 455 is for tracking user interactions with the application. The content could include any data (e.g., map data, prices, inventory, images, scripts, etc.) that the application wants to present to a user or otherwise needs to operate on the mobile device. The right side of the first stage 401 shows that the application is loading.

In the second stage 402, the mobile device 470 has received the content 450 with the embedded monitoring code 455. The embedded monitoring code of some embodiments is for tracking various system events (e.g., network connectivity, battery levels, operating system, etc.) and application events (e.g., user interactions, handled and unhandled errors, transactions, etc.). The right side of the second stage 402 shows that the application has loaded to show a map in the display area 460.

The third stage 403 shows that the user interacts with the map of the application to move the displayed map to the right. The monitoring code 455 captures the user's interaction with the map. In some embodiments, the monitoring code 455 causes the application to send a monitoring message 458 (and any other monitored data) to the monitoring server 310, as shown in the fourth stage 404. The monitoring server 310 analyzes the monitored data 458, along with the monitored data of other instances of the application operating on other mobile devices (not shown), and presents the monitored data to a developer of the application.

Figure 5A:
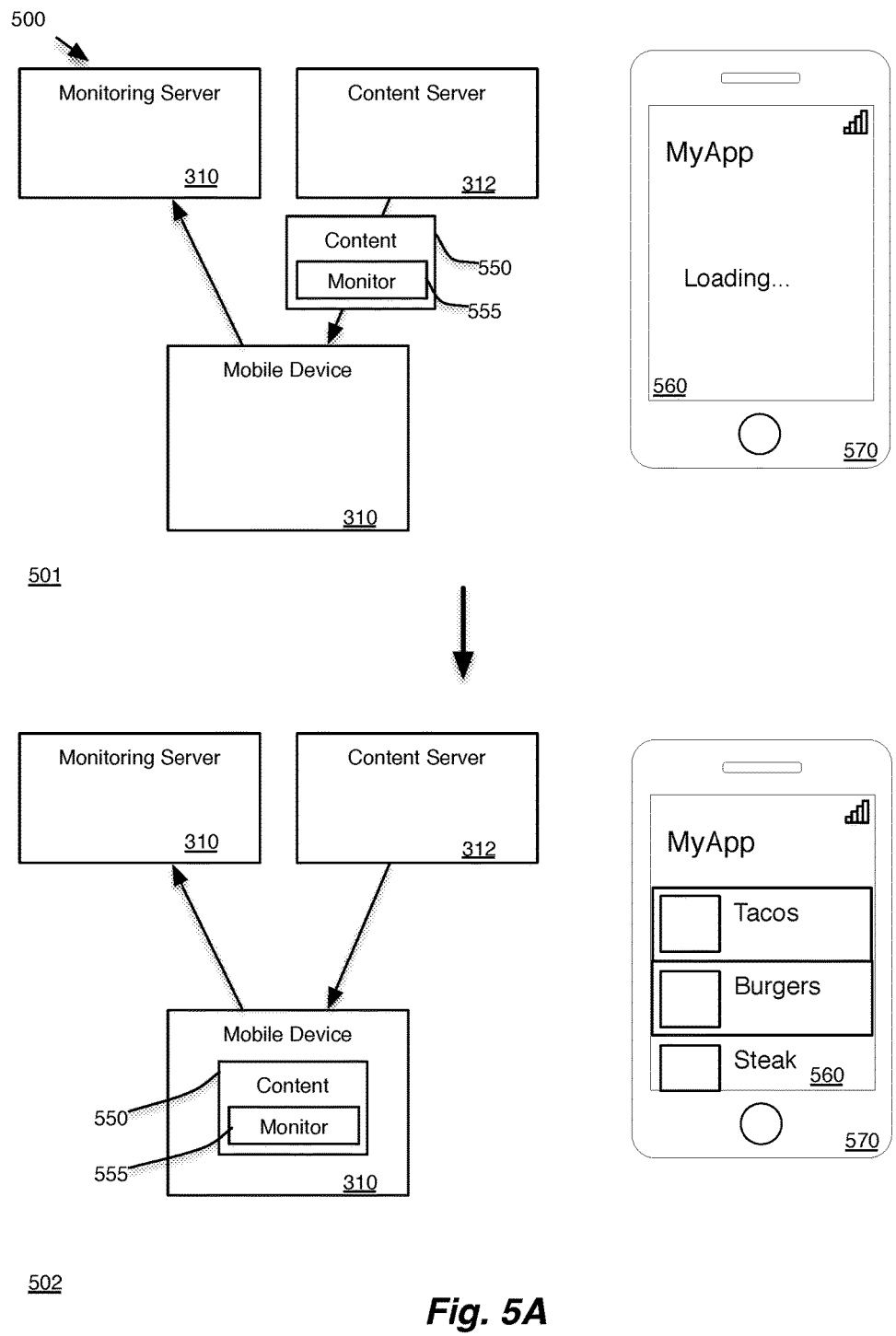
FIGS. 5A-B illustrates an example of monitoring developer-specified web view content based on embedded monitoring code.
Figure 5B:
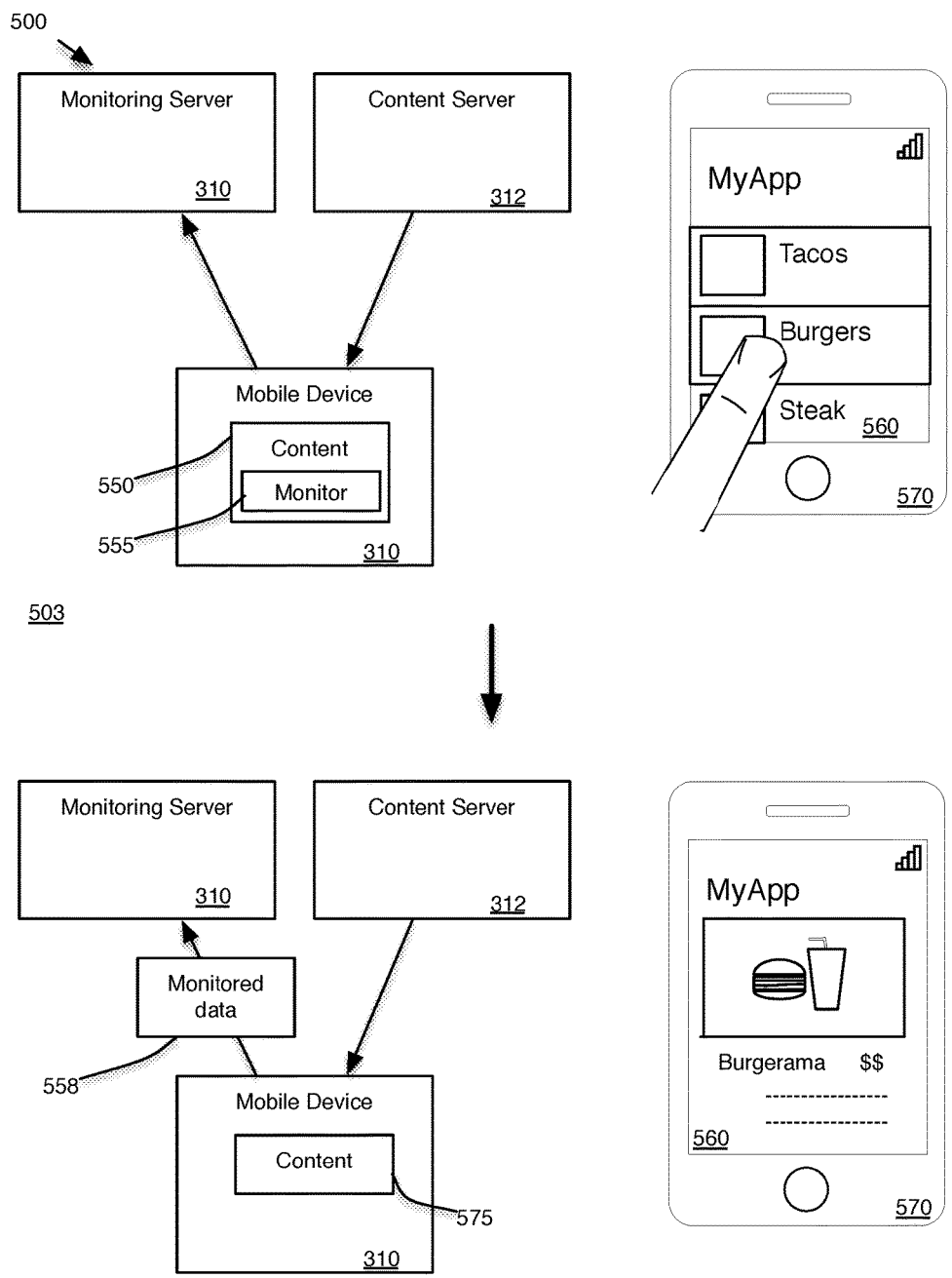

FIGS. 5A-B illustrates an example of monitoring developer-specified web view content based on embedded monitoring code in four stages 501-504. In some embodiments the web view content is monitored through calls to a monitoring library that are embedded into the code by the developer. Each stage of this example shows the system 500 on the left side and the application operating on a mobile device 570 on the right side.

The first stage 501 shows content server 312 sends content 550 with embedded monitoring code 555 to the mobile device 570. In this example, the embedded monitoring code 555 is for tracking user interactions with a web view of the application. The content could include any web view data (e.g., web pages, HTML, AJAX, JSON, etc.) that the web view can interpret and display for a user. The right side of the first stage 501 shows that the application is loading. In some embodiments, the web view is loaded from a native code interface. For example, in some cases, the application provides a native interface to show a particular set of information, but transitions to a web view interface for content that is more dynamic and frequently changed.

In the second stage 502, the mobile device 570 has received the web view content 550 with the embedded monitoring code 555. The embedded monitoring code of some embodiments is for tracking various web view events (e.g., user interactions, hyperlink selection, handled and unhandled errors, transactions, etc.). The right side of the second stage 502 shows that the application has loaded to show food listings in the display area 560 of the mobile device 570.

The third stage 503 shows that the user interacts with the food listings of the application to select "Burgers" from the displayed food listings. The monitoring code 555 captures the user's interaction with the food listings and causes the application to send a monitoring message 558 (and any other monitored data) to the monitoring server 310, as shown in the fourth stage 504. The monitoring server 310 analyzes the monitored data 558, along with the monitored data of other instances of the application operating on other mobile devices (not shown), and presents the monitored data to a developer of the application. The right side of the fourth stage 504 also shows that, in response to the user input of the third stage 503, a detailed restaurant listing based on newly received content 575 (in response to the user input) is shown in the display area 560.

Figure 6A:
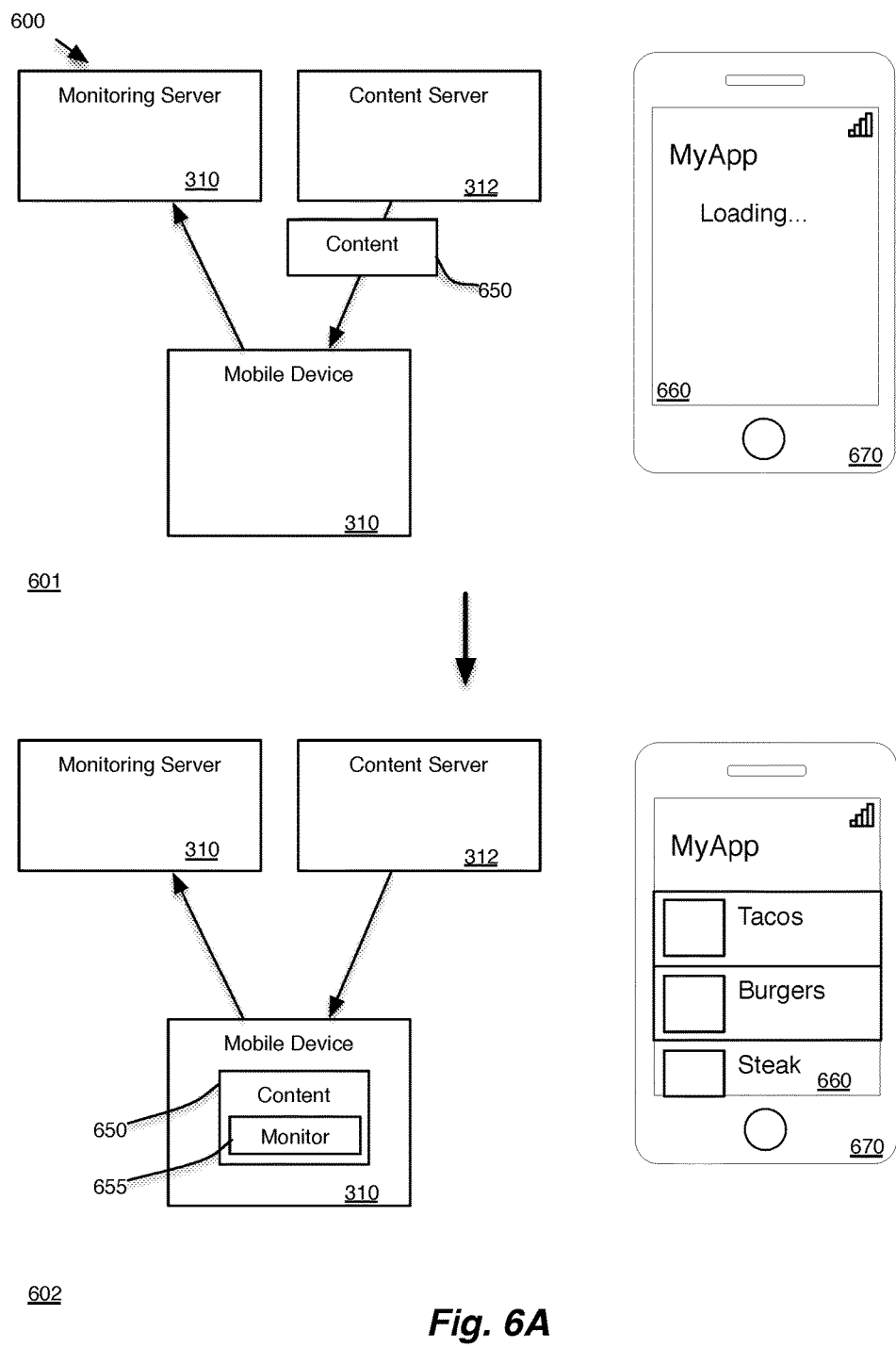
FIGS. 6A-B illustrates an example of injecting monitoring code to monitor web view events.
Figure 6B:
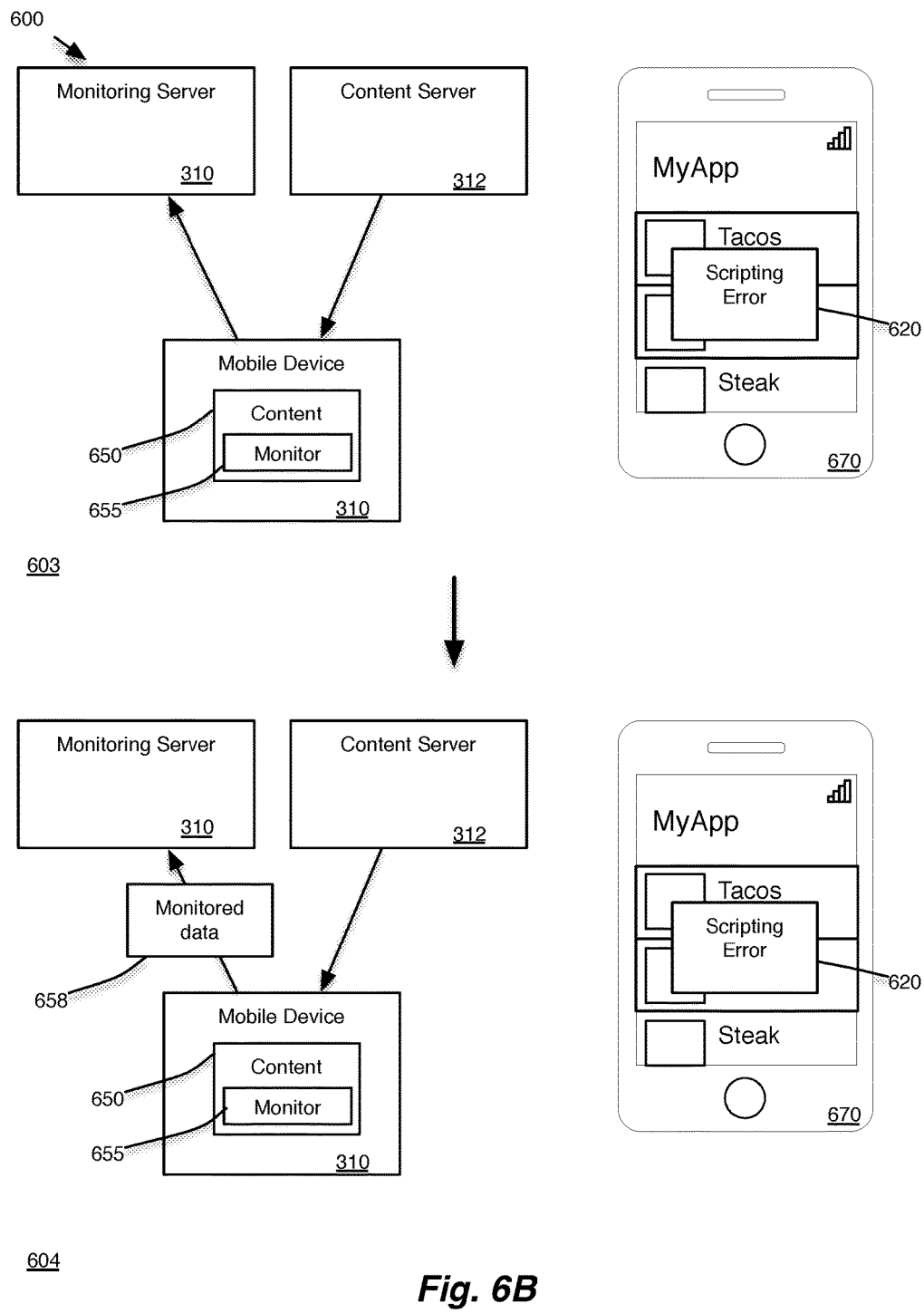

FIGS. 6A-B illustrates an example of injecting monitoring code to monitor web view events in four stages 601-604. In some embodiments the monitoring code is automatically injected into content provided for an application by a monitoring agent that operates with the application. Each stage of this example shows the system 600 on the left side and the application operating on a mobile device 670 on the right side.

The first stage 601 shows content server 312 sends content 650 to the mobile device 670, but unlike the example of FIG. 5, the content 650 does not yet show any monitor code. The content 650 could include any web view data (e.g., web pages, HTML, AJAX, JSON, etc.) that the web view can interpret and display for a user. The right side of the first stage 601 shows that the application is loading in the display area 660.

In the second stage 602, the mobile device 670 has received the content 650. The second stage 602 also shows that a monitoring agent (not shown) injects monitoring code 655 into the content 650. As described above, the injection in some embodiments performed through wrapper functions and callbacks. The injected monitoring code of some embodiments is for tracking various web view events (e.g., user interactions, network calls, handled and unhandled errors, transactions, etc.). In some embodiments, the monitoring agent automatically injects monitoring code for monitoring standard system events and errors, so that the developer only needs to embed special monitoring code for specific events that the developer wishes to track (e.g., breadcrumbs, transactions, etc.).

In this example, the content 650 was not shown to include any embedded monitoring code, but in some embodiments, the content 650 uses both embedded monitoring code and injected monitoring code to monitor the application. The right side of the second stage 602 shows that the application has loaded to show the food listings in the display area 660.

The right side of the third stage 603 shows that the mobile device 670 has triggered a scripting error 620 while displaying the content 650. The injected monitoring code 655 captures the scripting error 620 (e.g., through wrapper functions and/or callbacks) and causes the application to send a monitoring message 658 (and any other monitored data) to the monitoring server 310, as shown in the fourth stage 604. The monitoring server 310 analyzes the monitored data 658, along with the monitored data of other instances of the application operating on other mobile devices (not shown), and presents the monitored data to a developer of the application.

Figure 7:
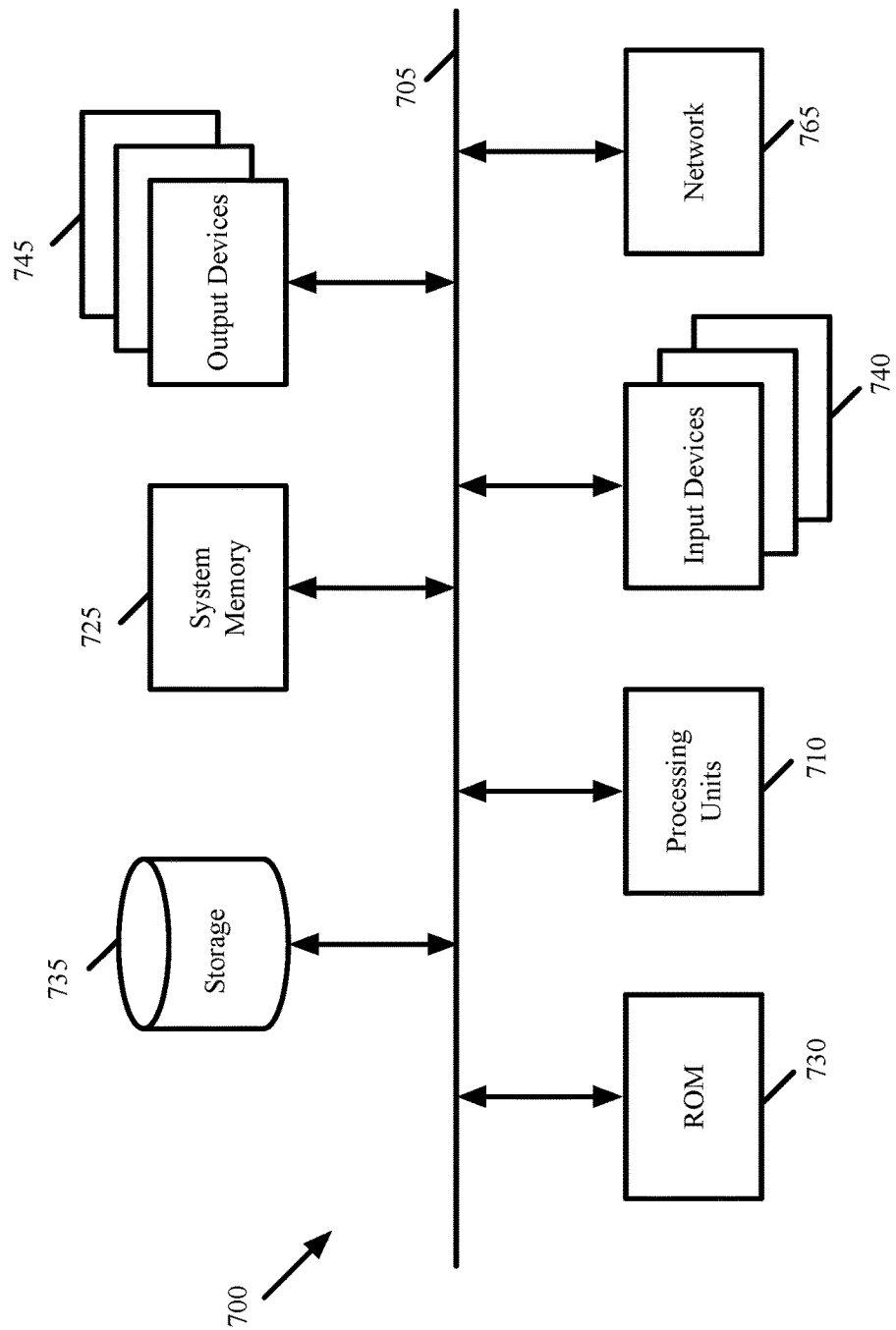
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, server computer, mainframe, a blade computer etc.), or any other sort of electronic device. This electronic system can be the network controller or a host computing device that executes some embodiments of the invention. As shown, the electronic system includes various types of computer readable media and interfaces for various other types of computer readable media. Specifically, the electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735. From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer or electronic device. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Therefore, one of ordinary skill in the art would understand that the invention is not to be limited by the foregoing illustrative details, but rather is to be defined by the appended claims.

We claim:

1. A non-transitory machine readable medium storing a first program which when executed by at least one processing unit of a device monitors a second program operating on the device, the first program comprising sets of instructions for:

receiving content data for the second program;

determining whether the received content data is associated with a web view of the first program;

injecting monitoring code into the content data when the received content data is associated with the web view, the monitoring code for monitoring events of the second program; and storing monitor data from the monitored events.

2. The non-transitory machine readable medium of claim 1, wherein the first program further comprises a set of instructions for sending the monitor data to a monitoring server, wherein the monitoring server compiles a set of monitoring metrics for a plurality of devices based on the monitor data.

3. The non-transitory machine readable medium of claim 2, wherein the set of monitoring metrics comprises at least one of a monthly active users (MAU), a daily active users (DAU), and web site loading statistics.

4. The non-transitory machine readable medium of claim 1, wherein the content data comprises embedded monitoring code that is specified by a developer of the second program in the content data at a content server.

5. The non-transitory machine readable medium of claim 4, wherein the injected monitoring code is for error handling in the second program and the embedded monitoring code is for tracking at least one of bread crumbs and transactions specified by the developer.

6. The non-transitory machine readable medium of claim 4, wherein storing monitor data comprises storing a first set of monitor data generated based on the embedded monitoring code and storing a second set of monitor data generated based on the injected monitoring code.

7. The non-transitory machine readable medium of claim 1, wherein the content data comprises at least one of HyperText Markup Language (HTML), JavaScript code, multimedia files, and cascading style sheets (CSS).

8. The non-transitory machine readable medium of claim 1, wherein the set of instructions for injecting the monitoring code comprises wrapping a portion of code of the received content data with a monitoring function that captures a set of parameters identified for the portion of code.

9. The non-transitory machine readable medium of claim 8, wherein the monitoring function generates a network call to a particular address, wherein the network call uses a custom uniform resource locator (URL) schema.

10. The non-transitory machine readable medium of claim 9, wherein the first program further comprises sets of instructions for:

capturing a set of network requests;

determining whether the set of network requests uses the custom URL schema; and when the set of network requests uses the custom URL schema, identifying the network requests as monitor data.

11. The non-transitory machine readable medium of claim 1, wherein the set of instructions for injecting the monitoring code comprises creating a JavaScript callback hook in the content data.

12. The non-transitory machine readable medium of claim 1, wherein the monitored events comprise at least one of a request for additional information from a content server and user input received by the second program.

13. A method for monitoring a web view of a hybrid application, comprising:

receiving content data for a second program operating on a device;

determining whether the received content data is associated with a web view of a first program;

injecting monitoring code into the content data when the received content data is associated with the web view, the monitoring code for monitoring events of the second program; and storing monitor data from the monitored events.

14. The method of claim 13, wherein the first program further comprises a set of instructions for sending the monitor data to a monitoring server, wherein the monitoring server compiles a set of monitoring metrics for a plurality of devices based on the monitor data.

15. The method of claim 14, wherein the set of monitoring metrics comprises at least one of a monthly active users (MAU), a daily active users (DAU), and web site loading statistics.

16. The method of claim 13, wherein the content data comprises embedded monitoring code that is specified by a developer of the second program in the content data at a content server.

17. The method of claim 16, wherein the injected monitoring code is for error handling in the second program and the embedded monitoring code is for tracking at least one of bread crumbs and transactions specified by the developer.

18. The method of claim 16, wherein storing monitor data comprises storing a first set of monitor data generated based on the embedded monitoring code and storing a second set of monitor data generated based on the injected monitoring code.

19. The method of claim 13, wherein the content data comprises at least one of HyperText Markup Language (HTML), JavaScript code, multimedia files, and cascading style sheets (CSS).

20. The method of claim 13, wherein the injecting the monitoring code comprises wrapping a portion of code of the received content data with a monitoring function that captures a set of parameters identified for the portion of code.

21. The method of claim 20, wherein the monitoring function generates a network call to a particular address, wherein the network call uses a custom uniform resource locator (URL) schema.

22. The method of claim 21, further comprising:

capturing a set of network requests;

determining whether the set of network requests uses the custom URL schema; and when the set of network requests uses the custom URL schema, identifying the network requests as monitor data.

23. The method of claim 13, wherein injecting the monitoring code comprises creating a JavaScript callback hook in the content data.

24. The method of claim 13, wherein the monitored events comprise at least one of a request for additional information from a content server and user input received by the second program.

* * * * *